United States Patent [19]

Nguyen et al.

[11] Patent Number: 5,826,046
[45] Date of Patent: Oct. 20, 1998

[54] METHOD AND APPARATUS FOR POLLING AND SELECTING ANY PAIRED DEVICE IN ANY DRAWER

[75] Inventors: Tram Thi Mai Nguyen; Thao Bich Bui; Christina Hien Tran, all of San Jose, Calif.

[73] Assignee: International Business Machines Corporation, Armonk, N.Y.

[21] Appl. No.: 367,518

[22] Filed: Dec. 30, 1994

[51] Int. Cl.$^6$ .................................................. H01J 13/00
[52] U.S. Cl. .......................... 395/309; 395/835; 395/836; 395/838; 395/857; 395/858; 395/859; 395/727; 395/741
[58] Field of Search .................................... 395/438, 439, 395/441, 894, 182.04, 183.18, 183.17, 872, 858, 876, 856, 182.05, 183.01, 862, 309, 857, 311, 184.01, 866, 800, 182.06, 182.11, 182.07, 835, 836, 838

[56] References Cited

U.S. PATENT DOCUMENTS

| | | |
|---|---|---|
| 5,185,884 | 2/1993 | Martin et al. ............................ 395/575 |
| 5,269,011 | 12/1993 | Yanai et al. ............................. 395/425 |
| 5,274,645 | 12/1993 | Idleman et al. ..................... 395/182.04 |
| 5,398,253 | 3/1995 | Gordon ................................. 371/40.4 |
| 5,410,667 | 4/1995 | Belsan et al. ........................... 395/425 |
| 5,459,857 | 10/1995 | Ludlam et al. .................... 395/182.04 |
| 5,537,566 | 7/1996 | Konno et al. ........................... 395/441 |
| 5,546,535 | 8/1996 | Stallmo et al. .................... 395/182.07 |
| 5,546,556 | 8/1996 | Matsushita ............................. 395/427 |
| 5,572,659 | 11/1996 | Iwasa et al. ....................... 395/182.04 |
| 5,611,069 | 3/1997 | Matoba ................................. 395/441 |
| 5,617,530 | 4/1997 | Stallmo et al. .................... 395/182.04 |

*Primary Examiner*—Jack B. Harvey
*Assistant Examiner*—Raymond N. Phan
*Attorney, Agent, or Firm*—Baker, Maxham, Jester & Meador

[57] ABSTRACT

A device adapter maintains a device polling table in memory that can be dynamically changed in response to disk drive device failures and is updated with each poll so that failed devices can be quickly deleted from the table and alternate device polling mapping can be achieved. A system reconfiguration is not necessary to implement the modifications to the system processing. The device adapter is capable of a greater variety of processing tasks than is conventional, including determining cylinder head position and copying data that otherwise would be performed by a control unit.

13 Claims, 11 Drawing Sheets

| Register Name | Number of Registers | Register Size |
|---|---|---|
| MASK_DESE_POLL | 1 register | 8 bits |
| ADDR_DESE_AB and ADDR_DESE_A'B' | 2 registers | 16 bits/register |
| MASK_DESE_AB or MASK_DESE_A'B' | 2 registers | 16 bits/register |
| POLL_DATA_AB and POLL_DATA_A'B' | 2 registers | 16 bits/register |
| POLL_DATA_AB_n | 8 registers | 16 bits/register where n is from 0 through 7 |
| MASKED_POLL_DATA_AB or MASKED_POLL_DATA_A'B' | 2 registers | 16 bits/register |
| DEF_DEV_ADDR | 1 register | 8 bits |
| PRI_DEV_ADDR | 1 register | 8 bits |
| PAIR_DEV_ADDR | 1 register | 8 bits |
| DEV_TYPE | 1 register | 3 bits |

| Table Name | Input | Output |
|---|---|---|
| Poll Summary Mask | Poll group (up to 8 groups) | MASK_DESE_POLL (8 bits) |
| Poll DESE Address and Device Interrupt Masks | Poll group (up to 8 groups) | ADDR_DESE_AB and ADDR_DESE_A'B' (16 bits/register); MASK_DESE_AB and MASK_DESE_A'B' |
| Map Poll Data 2-to-1 | MASKED_POLL_DATA_AB and MASKED_POLL_DATA_A'B' (16 bits/register) | Final result of poll information (8 bits) |
| Logical to Physical Device Address (Logical to HDA) | Logical device address (128 addresses) | ADDR_DESE_AB and ADDR_DESE_A'B'(16 bits/register); physical devices addresses, DEF_DEV_ADDR and PAIR_DEV_ADDR (8 bits/register); device type (3 bits) |
| Map Physical Device to Device Address Within a Drawer (Map HDA) | Physical device address(es): DEF_DEV_ADDR or PAIR_DEV_ADDR (8 bits/register) | Value to be set in DESE register (16 bits) |
| Drawer Poll Information | ADDR_DESE_AB or ADDR_DESE_A'B' (16 bits/register) and device poll data | Poll information of each physical device address (8 registers of 16 bits/register); POLL_DATA_AB and POLL_DATA_A'B' |
| Interrupt from physical device address | DEF_DEV_ADDR or PAIR_DEV_ADDR (8 bits/register) | Interrupt information |

| Operation | Table | Register |
|---|---|---|
| Read summary poll register and combine DESEs A and B summary poll | None | SUM_POLL='FF'x |
| Obtain summary poll mask | "Poll Summary Mask" table | MASK_DESE_POLL='C0'x |
| AND MASK_DESE_POLL and SUM_POLL to check if desired logical poll group has an interrupt | None | Result='C0'x or nonzero, then go to perform poll |
| Obtain DESE addresses and masks | "Poll DESE Address and Device Interrupt Masks" table | ADDR_DESE_AB='00FF'x; ADDR_DESE_A'B'='019'x; MASK_DESE_AB='FEFF'x (indicates that device 07 has failed); MASK_DESE_A'B'='0002'x |
| Poll both drawers to obtain device interrupts | None | POLL_DATA_AB='8340'x; POLL_DATA_A'B'='FF06'x |
| AND MASK_DESE_AB with POLL_DATA_AB; AND MASK_DESE_A'B' with POLL_DATA_A'B' | None | MASKED_POLL_DATA_AB= '8240'x; MASKED_POLL_DATA_A'B'= '0002'x |
| Because MASKED_POLL_DATA_A'B' is nonzero, map the interrupt of device '4E'x to device '07'x | None | NOT MASK_DESE_AB='0100'x POLL_DATA_AB=0100'x or '8240'x='8340'x |
| OR the L(POLL_DATA_AB with R(POLL_DATA_AB) | None | Result='C3'x |
| Save the device interrupts in an internal register to be used for selection process | "Drawer Poll Information" table | POLL_DATA_AB_0='8340'x; POLL_DATA_AB_1='FF06'x |

*FIG. 9*

| Operation | Table | Register |
|---|---|---|
| Decode Logical Device address to obtain physical device information | "Logical to Physical Device Address" table | ADDR_DESE_AB='00FF'x; ADDR_DESE_A'B'='FFFF'x; DEF_DEV_ADDR='00'x; PAIR_DEV_ADDR='40'x; PRI_DEV_TYPE=High Availability. |
| Determine which physical device to select first | "Drawer Poll Information" table | Device '00'x has interrupt; therefore, select device '00'x first. Set PRI_DEV_ADDR= DEF_DEV_ADDR. |
| Obtain device address within a drawer | "Map Physical Device to Device Address Within a Drawer" table | DRAWER_DEV_ADDR='00'x |

FIG. 11

METHOD AND APPARATUS FOR POLLING AND SELECTING ANY PAIRED DEVICE IN ANY DRAWER

BACKGROUND OF THE INVENTION

1. Field of the Invention

This invention relates generally to controlling direct access storage devices and, more particularly, to recording and retrieving data from one of multiple devices in a computer system.

2. Description of the Related Art

Many large-scale computer systems, such as systems having a "System/360" or "System/390" central processor unit produced by International Business Machines Corporation ("IBM"), are capable of storing relatively large amounts of data on direct access storage devices (DASD) comprising disk drive devices. The DASDs often are arranged according to a disk mirroring scheme in which identical copies of data are kept on a pair of disk drive devices that are designated as mirror pairs of one another. Generally, one disk drive device is designated as a primary drive and the other disk unit is designated as the paired drive. If one disk drive in a mirrored pair fails, then the system can obtain data from the other disk drive of the pair and continue functioning until the failed disk drive device can be repaired.

Some systems utilize disk arrays in which multiple pairs of disk drive devices are placed in logical groups that are accessed by the central processor unit through a device called a control unit, which in turn is connected to the disk drive devices through a device adapter. The control unit receives read and write requests from the system central processor unit and in response generates a stream of commands to the device adapter that will either retrieve data from the disk drive devices or record data into appropriate disk drive devices. Each device adapter of a system is responsible for a certain number of disk drive devices and carries out the commands from the control unit. This distributed arrangement of processing permits the control unit to carry on with further input/output processing after providing instruction to a device adapter.

For example, after the control unit receives a central processor request for a read or a write operation, the control unit selects the appropriate device adapter, which polls the disk drive devices to which it is connected so as to obtain the drive status. If the device is available, the control unit then provides the device adapter with a device address and commands the device adapter to select the disk drive device, which comprises establishing communication between the device and the device adapter. The control unit then determines the position of a disk cylinder head relative to a storage location on a disk of the disk drive device corresponding to the data record to be read or written. The control unit passes the position information on to the device adapter, which passes the position information to a disk drive device I/O controller. The disk drive device I/O controller is a direct interface to a servo position control system that controls movement of a read/write head of the disk drive device.

The control unit then de-selects the device adapter and continues with other operations. When the disk I/O controller determines that the disk is properly positioned, it generates an interrupt signal and provides it to the device adapter. When the control unit next polls the device adapter for the device status, it recognizes the ready condition.

In the case of a read request from the central processor unit, the control unit responds to the ready condition by causing a read instruction to be passed to the device adapter, which passes a disk read instruction to the disk I/O controller for actual execution of a read operation. In the case of a write request, the control unit provides the device adapter with the data to be written. The device adapter passes on the write instruction and data to the disk I/O controller, which again causes the actual execution of the write operation. To implement the disk mirroring, the control unit actually provides a second copy of the data and the write instruction to the device adapter so that the write sequence is repeated for the paired disk drive device. The device adapter confirms the successful operation to the control unit. After the data is either read from or recorded into the disk drive device, the control unit de-selects the device adapter, permitting it to receive further requests for data reading and writing operations.

The polling table described above is ordered according to the hardware configuration of the disk drive devices connected to the central processing unit. Thus, the polling table reflects the system configuration and is set at the time of disk installation and system configuration. As noted above, if one disk drive in a mirrored pair fails, then the system can obtain data from the other disk drive of the pair. The polling table is the means by which the system generally, and the device adapter in particular, determines which disk drive devices are operational and which have failed. If polling indicates that a disk drive device has failed, then the device adapter masks out the device address table entry and polling entry for that disk drive device. In this way, the device adapter ensures that the control unit will not select that failed device. Thus, the polling table is not changed, rather, data from the table is masked out so the data can be ignored. After a failed unit is repaired or replaced, the next instance of polling will reflect the new condition.

As noted above, the mapping of logical data units to physical devices specified by the device address table and polling table are fixed at the time of system configuration. That is, the polling table indexing and the disk drive devices corresponding to each entry in the polling table are recorded in microcode of the device adapter. Thus, if both drives of a disk drive pair fail, then data operations cannot be carried out for any records stored on those disk drive devices and the data likely will be lost. Rather, it will be necessary to halt processing operations and carry out disk drive device replacement. It will not be possible to add additional disk drive devices to the system dynamically during processing operations or to substitute idle or unused disk drive devices of the system in place of any failed units. Such modifications would require changing the mapping of the polling table during operations, in real time. Generally, the polling table mapping can only be changed through modification of the device adapter microcode. This is a process that generally can be accomplished only in conjunction with a reconfiguration of the entire system, which is a relatively time-consuming and complicated task.

From the discussion above, it should be apparent that there is a need for a system that permits dynamic reconfiguration of the polling table in a computing system having a direct access storage device array, thereby permitting modifications to the polling table indexing to occur in response to device failure without need for reconfiguration of the system. The present invention satisfies this need.

SUMMARY OF THE INVENTION

In accordance with the invention, a device adapter maintains a device polling table in memory that can be dynamically changed in response to disk drive device failures and is updated with each poll so that failed devices can be quickly deleted from the table and alternate device polling mapping can be achieved. A system reconfiguration is not necessary to implement the modifications to the system processing. The device adapter is capable of independently carrying out a greater variety of processing tasks than is conventional, including determining cylinder head position and copying data for a mirrored pair, that otherwise would be performed by the control unit. In this way, the device adapter in accordance with the present invention reduces dependence on the control unit for processing and reduces disk read/write latency.

In one aspect of the invention, the device adapter is constructed such that the disk drive devices of a disk array are arranged into groups of disk drive devices referred to as drawers. The device adapter can implement mirrored pairs of disk drive devices either within a drawer or across drawer boundaries. In addition, an entire drawer can be mirrored with a back-up drawer of devices. If device control elements within a drawer fail, then the device adapter can turn to the back-up drawer and reassign polling accordingly. Each drawer includes a device electronic switch element that provides input/output electronic for controlling the flow of data and instructions between the device adapter and the individual disk I/O controllers. The device electronic switch elements are separately addressable, thereby permitting them to be mirrored, as are the individual disk drives and the drawers.

Other features and advantages of the present invention should be apparent from the following description of the preferred embodiment, which illustrates, by way of example, the principles of the invention.

BRIEF DESCRIPTION OF THE DRAWINGS

FIG. 4 is a representation of polling and selection registers of the device adapter illustrated in FIG. 2.

FIG. 5 is a representation of polling and selection tables of the device adapter illustrated in FIG. 2.

FIG. 9 is a table of changing values created by the processing steps carried out by the DA control unit in performing the polling operation as illustrated in FIG. 8.

FIG. 11 is a table of changing values created by the processing steps carried out by the DA control unit in performing the selection operation as illustrated in FIG. 10.

DESCRIPTION OF THE PREFERRED EMBODIMENT

Figure 1:
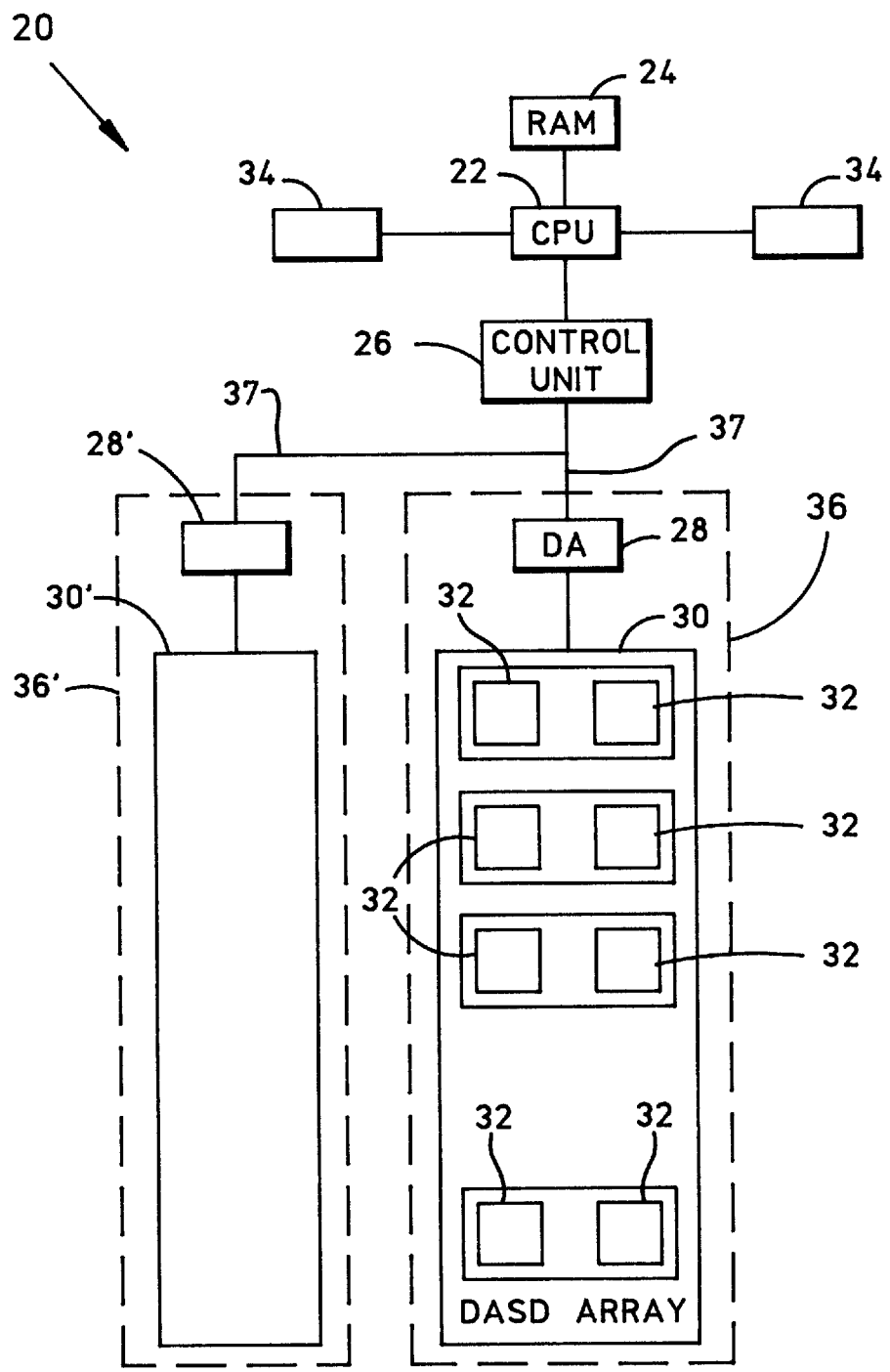
FIG. 1 is block diagram of a computer system constructed in accordance with the present invention.

FIG. 1 shows a computer system 20, constructed in accordance with the present invention, that includes a central processor unit (CPU) 22 and random access memory (RAM) 24 in which data is temporarily stored. A system control unit 26 provides an interface to a device adapter (DA) 28, which is connected to a direct access storage device (DASD) array 30. The DASD array comprises a group of DASD units, such as disk drive devices 32. Computer system users 34 are connected to the CPU 22 from which they request data that is read from the disk drive devices 32 of the DASD array 30 and to which they provide data that is recorded into the disk drive devices. In accordance with the invention, the preferred embodiment of the device adapter 28 includes a polling table that is dynamically changed in response to disk drive device failures so that failed devices are deleted from the table and replaced with an alternate device poll mapping. The polling table can be dynamically changed so that a spare disk drive device can take the place of any one of a pair of mirrored units with no interruption to the system processing. In this way, a system reconfiguration is not necessary to implement changes to the disk drive device pairing.

The CPU 22 can comprise, for example, a mainframe processor such as the products called "System/360" and "System/390" produced by International Business Machines Corporation ("IBM"). Alternatively, the CPU can comprise a smaller machine such as a workstation or IBM "Personal Computer"("PC") or similar machine. The users can comprise workstations or IBM PCs or similar machines.

FIG. 1 indicates that the system control unit 26 can be coupled to additional device adapters, one of which 28' is shown, that can each be coupled to a corresponding DASD array 30' having multiple disk drive devices. Each of the disk drive devices in the DASD arrays can comprise single hard disk drives, for example, or can comprise multiple-disk drive devices having disk "cylinders" in which disk platters are stacked. The combination of a device adapter and DASD array comprises a data storage subsystem 36 of the computer system 20. The DASD system control unit 26 is connected to the DASD arrays 36,36' by a data bus 37. In the preferred embodiment, the disk drive devices are arranged according to a disk mirroring scheme in which identical copies of data are kept on each of a pair of disk drive devices in the DASD array 30 that are designated as mirror pairs of one another. Such a configuration is maintained by the device adapter 28.

Figure 2:
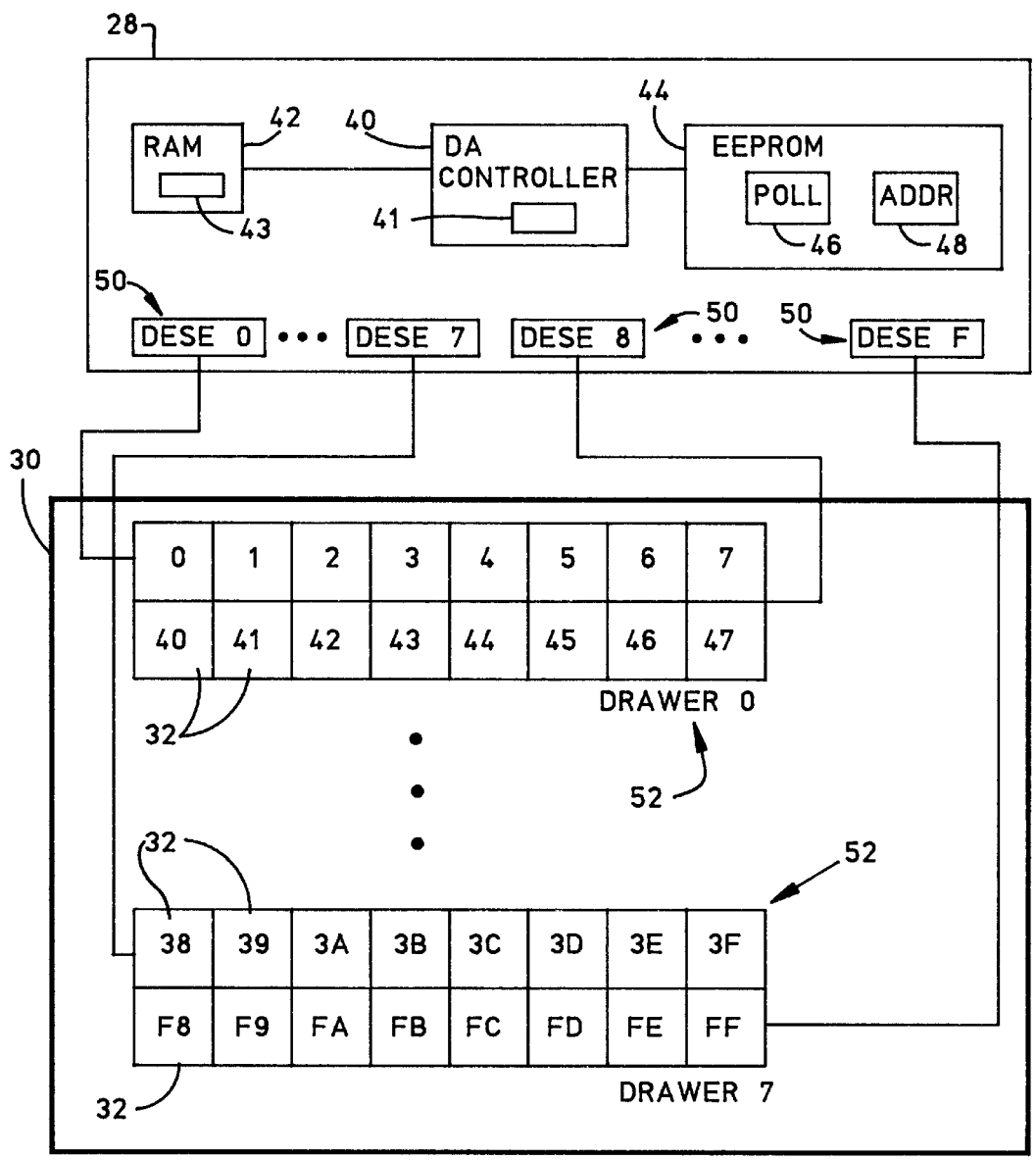
FIG. 2 is a block diagram of the disk drive device adapter and DASD array illustrated in FIG. 1.

FIG. 2 shows that the device adapter 28 includes a DA controller 40 that can be implemented, for example, as a microprocessor that can execute program steps according to predetermined instruction codes. The device adapter includes dynamic memory (RAM) 42 and an electronically erasable programmable read only memory (EEPROM) 44 that communicate with the DA controller. The EEPROM of the device adapter includes a polling table 46 and a device address table 48 that are maintained by the DA controller. As described more fully below, the DA controller references and updates the polling table and the device address table in carrying out requests for reading and writing data.

FIG. 2 indicates that the device adapter 28 includes multiple device electronic switching elements (DESE) 50 that are each connected to eight disk drive devices 32 of the DASD array 30. FIG. 2 also indicates that the DASD array is logically organized into groups of disk drive devices called "drawers" 52. The DASD array includes eight drawers, of which only the first (Drawer 0) and last (Drawer 7) are shown for simplicity of illustration, and the disk drive devices of each drawer are connected to two DESEs. Thus, the device adapter 28 includes eight pairs of DESEs, a total of sixteen, that are identified as DESE 0, DESE 1, . . . , DESE F. Not all of the DESE pairs are shown for simplicity of illustration. Each DESE provides an electronic interface between the device adapter 28 and the disk drive devices to which the DESE is connected.

Figure 3:
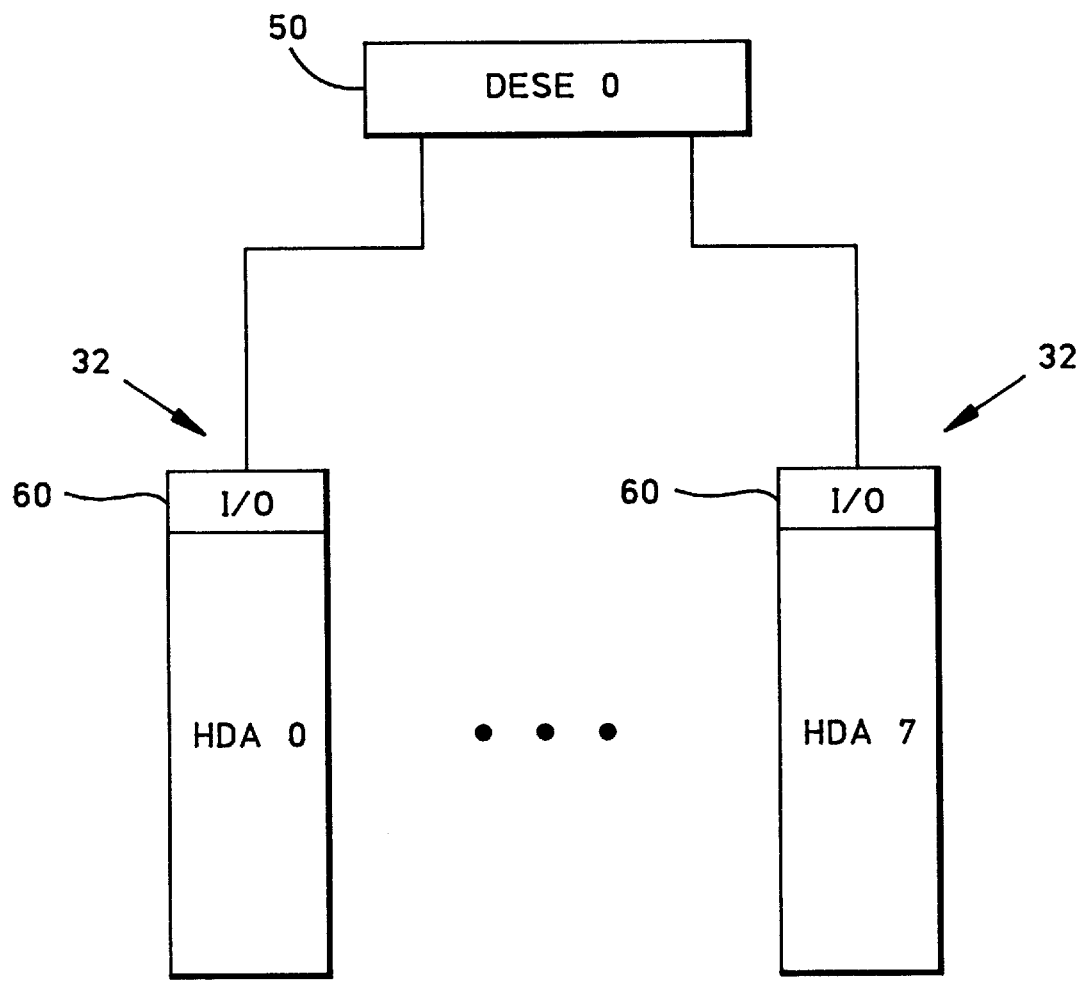
FIG. 3 is a block diagram of the device electronic switching elements and disk drive devices of the DASD array illustrated in FIG. 1.

A disk drive device is referenced by a hardware address (HDA) and therefore is frequently referred to by an HDA designation. FIG. 3 diagrammatically illustrates that the disk drive devices connected to a DESE can be designated with relative logical addresses that are identified as HDA 0, HDA 1, . . . , HDA 7. In FIG. 3, the first DESE of the device adapter 28 is illustrated and is identified as DESE 0. FIG. 3 also shows that each of the disk drive devices 32 includes a disk I/O controller 60 to which the corresponding DESE is actually connected. Those skilled in the art will appreciate that a disk I/O controller is a direct interface to a servo position control system (not illustrated) of the disk drive device that controls movement of a disk drive read/write head and that the disk I/O controller manages the actual reading and writing operations to the disk carried within the disk drive device.

Referring again to FIG. 2, in the preferred embodiment, the disk drive devices connected to a single DESE are a mirror pair and therefore one of the pair is referred to as the primary device and the other is referred to as the paired device. Thus, the DASD array 30 includes sixty-four logically addressable primary disk drive devices and another sixty-four paired devices for a total of one hundred twenty-eight disk drive devices. As described more fully below, the DASD array advantageously can be implemented with a variety of mirror schemes. For example, the disk drive devices can be mirrored within a drawer so that half of the devices connected to a DESE are primary devices and the other half are corresponding paired devices. Alternatively, all of the devices connected to a particular DESE can be primary devices and all of the devices connected to another DESE can be corresponding paired devices. Finally, all of the devices in a drawer can be primary devices and all of the devices in another drawer can be corresponding paired devices. The selection of the mirror scheme can be made in accordance with a failure analysis or other considerations that determines whether it is better to have redundancy of disk drive devices for each DESE, or within a drawer, or across drawers.

With reference again to FIG. 1, the system control unit 26 receives read and write requests from the system CPU 22 and in response generates a stream of commands that are provided to a selected one of the device adapters 28, 28'. For example, after the system control unit receives a request for a read or a write operation, the control unit selects the device adapter 28, which provides polling information that indicates the status of the disk drive devices in the DASD array 30 to which it is connected. In accordance with the invention, the device adapter performs group polling whenever it is not otherwise performing input/output tasks. The group polling collects the status of all designated disk drive devices in the DASD array. In this way, the device adapter always has recent poll data that it can provide to the system control unit 26 immediately upon request. Thus, it is not necessary for the control unit to give the device adapter time to obtain polling information after requesting the information. This reduces disk latency time, which refers to the time necessary for a disk in a disk drive device to be properly positioned for execution of a read or write operation.

If the polling information indicates the desired disk drive device is available, then the DASD array system control unit 26 provides the device adapter 28 with a device address and commands the device adapter to select the disk drive device. In accordance with the invention, if the device adapter 28 knows that the selected device has failed, then the device adapter automatically selects the device with which the failed device was paired. In addition to having polling information immediately available to the system control unit 26, the device adapter in accordance with the invention determines the position of a storage location on a disk of the disk drive device corresponding to the data record to be read or written relative to a disk head of the device.

The device adapter 28 determines the disk position relative to the head, generally referred to as the cylinder head position, at the time of receiving the device address from the system control unit 26. The determination is made in the same manner as it would otherwise be made in a conventional storage subsystem that provides such information to a DASD controller. The position information is passed by the device adapter 28 to the disk drive device I/O controller 60. When the disk I/O controller determines that the disk is properly positioned, it generates an interrupt signal and provides it to the device adapter. When the system control unit 26 next polls the device adapter for the device status, it recognizes the ready condition.

In the case of a read request from the central processor unit 22 (FIG. 1), the DASD array system control unit 26 responds to the ready condition by causing a read instruction to be passed to the device adapter 28, which passes a disk read instruction to the disk I/O controller 60 for actual execution of a read operation. In the case of a write request, the system control unit provides the device adapter with the data to be written. The device adapter passes on the write instruction and data to the disk I/O controller, which again causes the actual execution of the write operation.

To better implement disk mirroring, the device adapter 28 in accordance with the invention advantageously includes a buffer 43 in its RAM 42 (FIG. 2) that temporarily stores the write data received from the DASD array control unit 26. The device adapter can therefore provide the disk I/O controller 60 of the paired device with the second copy of the data to be written without the need for another write operation sequence involving the DASD array controller. The device adapter confirms the successful operation to the controller after the data is either read from or recorded into the disk drive device 32. The system control limit 26 then de-selects the device adapter, permitting it to receive further requests for data reading and writing operations.

To perform proper polling and selection of the disk drive devices, the DA controller 40 of the device adapter 28 includes polling and selection registers 41 that are illustrated in FIG. 2. The registers are used to extract the appropriate data from the polling tables 46 and address tables 48 of the device adapter, as described more fully below. The configuration of the registers is illustrated in FIG. 4, which shows that the preferred embodiment includes registers referred to as MASK_DESE_POLL, ADDR_DESE_AB, ADDR_DESE_A'B', MASK_DESE_AB, MASK_DESE_A'B', POLL_DATA_AB, POLL_DATA_A'B', POLL_DATA_AB_n, MASKED_POLL_DATA_AB, MASKED_POLL_DATA_A'B', DEF_DEV_ADDR, PRI_DEV_ADDR, PAIR_DEV_ADDR, and DEV_TYPE. The A and B designations refer to a primary DESE and paired DESE, respectively. That is, a primary DESE A of mirror DESEs in a drawer is used as a default value and a paired DESE B of the mirror DESEs in the same drawer is used only if the DESE A fails. Similarly, the A, A' and B, B' designations refer to mirror primary device adapters and paired device adapters, respectively. It should be understood that such pairing of device adapters is optional and provides increased operational redundancy. FIG. 4 indicates the relative number and size of the registers for the preferred embodiment, which includes sixty-four addressable primary devices.

The MASK_DESE_POLL register contains a mask byte that determines a device poll group to which a drawer belongs. Each bit of this register indicates a different poll group. That is, a value of "1" in the least significant bit indicates the poll group for drawer 0, a "1" in the next significant bit indicates the poll group for drawer 1, and so forth. The ADDR_DESE_AB register contains a DESE A address in a high byte and contains a DESE B address in a low byte. If a DESE fails, then its address is set to an octal value of 'FF', indicated as 'FF'x. The ADDR_DESE_A'B' register corresponds to the DESE addresses from a second, paired drawer. This register value is set to 'FFFF'x if there is no paired drawer (that is, if the mirroring scheme does not have primary drawers and paired drawers).

The MASK_DESE_AB and MASK_DESE_A'B' registers each contain a mask byte that is used to extract poll data for a drawer to obtain poll information for a group poll. Those skilled in the art will appreciate that a mask comprises a data word that is used in conjunction with logical OR and logical AND operations applied to a target data word to extract desired bits and zero-out undesired or unimportant bits from the target word. The POLL_DATA_AB and POLL_DATA_A'B' registers are 16-bit registers that contain poll data from each of the sixteen disk drive devices (HDAs) in a selected drawer. The POLL_DATA_AB_n register contains poll data from each device in each drawer, where n=0, 1, . . . , 7 corresponding to each of the eight drawers. Thus, the POLL_DATA_AB registers and POLL_DATA_A'B' registers are used as temporary storage registers that contain working data. The MASKED_POLL_DATA_AB and MASKED_POLL_DATA_A'B' registers contain poll information from a group poll in a drawer. More particularly, these registers contain the result of a logical AND operation (logical product) of the data in the MASK_DESE_AB and POLL_DATA_AB registers (or corresponding A'B' registers for the mask and poll data).

The DEF_DEV_ADDR register contains a hardware device address mapped from the corresponding logical device address. If the device is a paired device, then this register contains the address of the default primary device. For example, assume that a primary disk drive device having a hardware address (HDA) of '63'x is mirrored with a paired device having an HDA of '72'x. If the primary device fails, then the HDA of '63'x will be mapped to the logical device address of '72'x. That is, any operation that otherwise would be directed to the device having an HDA of '63'x will, by the DEF_DEV_ADDR register mapping, instead be directed to the device having an HDA of '72'x. The PRI_DEV_ADDR register contains the hardware device address of the primary device to be selected. The PAIR_DEV_ADDR register contains the hardware device address of the paired device corresponding to the selected primary device indicated by the PRI_DEV_ADDR register. Finally, the DEV_TYPE register contains a flag that indicates whether a device is a primary device or a paired device.

The device adapter 28 includes polling and selection tables that the DA controller 40 uses in performing the polling and selecting tasks. The configuration of the tables is illustrated in FIG. 5, which shows that the preferred embodiment includes tables with titles called Poll Summary Mask, Poll DESE Address and Device Interrupt Masks, Map Poll Data 2-to-1, Logical to Physical Device Address (HDA), Map Physical Device to Device Address Within a Drawer (Map HDA), Drawer Poll Information, and Interrupt from Physical Device Address. The input information column indicates the table indexing and the output information column indicates the data that is extracted from the tables.

The Poll Summary Mask table provides the MASK_DESE_POLL data for each of the eight poll groups corresponding to each of the drawers. The Poll DESE Address and Device Interrupt Masks table contains the DESE address data and device interrupt masks that determine the DESE addresses of each poll group and are indexed by the poll group number. The Map Poll Data 2-to-1 table maps the 8-bit polling data of disk drive devices from two drawers into one drawer (described further below) and is indexed according to the data contained in the MASKED_POLL_DATA_AB register and MASKED_POLL_DATA_A'B' register. The Logical to Physical Device Address table contains the disk drive device address corresponding to each of the one hundred twenty-eight logical addresses of the devices in the DASD array. As indicated in FIG. 5, the data provided in each entry of the Logical to HDA table includes the DESE address, the HDA or physical device address, and the device type data. The data in all of these tables are initially provided at the time of hardware configuration or other similar maintenance operation and thereafter can be dynamically updated by the DA controller 40 of the device adapter.

The Map Physical Device to Device Address Within a Drawer table contains the hardware address (HDA) of a disk drive device in a drawer that is to be selected by being placed into a DESE register. Thus, this table is indexed by the DEF_DEV_ADDR value or the PAIR_DEV_ADDR value. The device adapter controller changes the data in this table as devices are selected during system operation. The Drawer Poll Information table contains poll information of each disk drive device in a drawer and is indexed by the DESE address data. This table is updated by the DA controller 40 at each poll. Finally, the Interrupt from Physical Device Addresses table contains an interrupt flag that indicates whether a corresponding disk drive device requires service. The interrupt can indicate a waiting data operation, or a failed data operation, or similar device operational problem that requires attention from the DASD array controller. This table also is updated at each poll.

Figure 6:
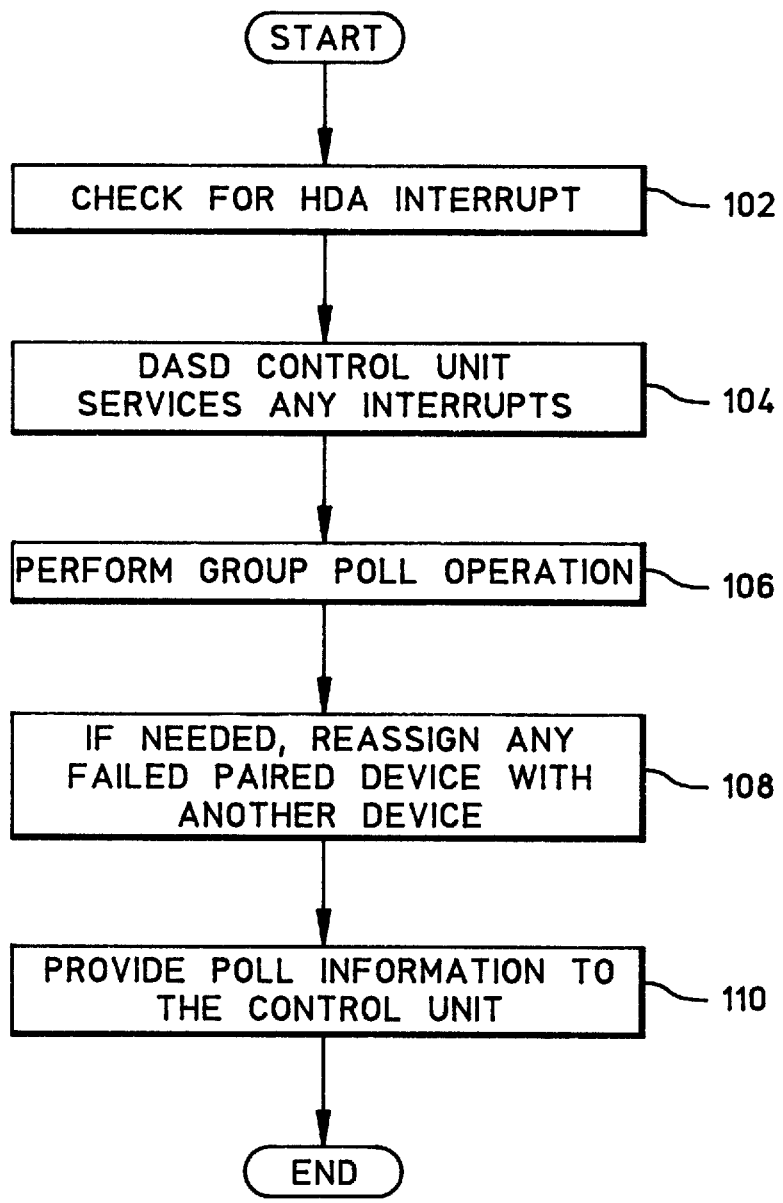
FIG. 6 is a flow diagram illustrating the processing steps followed by the device adapter of FIG. 2 in carrying out polling.

As noted above, the device adapter 28 performs polling whenever it is not otherwise occupied with other tasks. FIG. 6 is a flow diagram illustrating the processing steps followed by the device adapter in carrying out polling. As indicated by the flow diagram box numbered 102, the first step in carrying out polling is to check for any active interrupts. That is, this step checks to determine if one of the DESEs contains a disk drive device that requires attention. This step is performed by obtaining summary poll information from the sixteen DESEs of the DASD array 30. The summary poll information is a 16-bit data value assembled by the DA controller 40 based on data generated by the disk drive devices and sent over status lines of the DESEs to the data bus 37 for receipt by the device adapter. Status lines for disk drive devices are well-known in the art and require no further explanation.

The zero bit of the summary poll information, the least significant bit, corresponds to DESE 0 (see FIG. 2). The next bit of the information corresponds to DESE 1, and so forth. It should be apparent that, because DESE 0 and DESE 8 are mirrored, they correspond to a primary DESE and paired DESE, respectively. Therefore, they are redundant and should have identical status bits. Nevertheless, the DA controller 40 provides the DESE status by performing a logical OR operation of the high byte with the low byte. The DA controller next obtains a mask byte from the Poll Summary Mask table according to the DESE whose status is being polled. The mask byte indicates which devices, if any, have failed. The Poll Summary Mask table initially contains entries having all "1" values ('FF'x), such that any logical OR operation with the mask byte will reproduce all the target data. As devices fail, the DA controller changes corresponding bits in the Poll Summary Mask table to zero values. In this way, selected poll interrupt information can be discarded when coming from a failed disk drive device. In the next polling step, represented by the FIG. 6 flow diagram box numbered 104, the system control unit 26 services any interrupt detected by the previous step 102.

Next as represented by the flow diagram box numbered 106, the DA controller 40 performs a group poll operation. Polling is performed by the DA controller 40 on a drawer-by-drawer basis. Thus, for the configuration illustrated in FIG. 2, there will be eight poll groups corresponding to Drawer 0 through Drawer 7. The group poll operation comprises first obtaining DESE addresses for the current poll group, along with corresponding device interrupt masks, by using the Poll DESE Address/Interrupt Mask table. The DA controller will obtain up to four DESE addresses for each poll group, comprising a primary DESE (DESE A) address and a paired DESE (DESE B) address of the primary device adapter and also a primary DESE address and a paired DESE address (DESE A', DESE B') for the optional paired device adapter. These addresses are saved in the ADDR_DESE_AB and ADDR_DESE_A'B' registers, respectively. If all the within the sameness of the poll group are within the same drawer, then the A'B' address register contains 'FFFF'x. If a DESE fails, then its 8-bit address is invalidated by replacing it with 'FF'x. The DA controller also will obtain corresponding interrupt mask words from the table and will store the mask words in the MASK_DESE_AB and MASK_DESE_A'B' registers.

The next processing task involved in the group polling operation represented by the flow diagram box numbered 106 is for the DA controller to poll the drawer corresponding to the DESE A address. If the poll information cannot be obtained from the DESE A address, then the DA controller repeats the drawer poll for the DESE B address. The poll information comprises the status of the eight disk drive devices connected to DESE A and the status of the eight disk drive devices connected to DESE B. The polling information is saved in the appropriate POLL_DATA_AB register according to the drawer in which the DESEs are located, as the device adapter includes one such register for each drawer. The next processing task is for the DA controller to perform a logical AND operation on the respective MASK_DESE_AB and POLL_DATA_AB values, saving the result in the MASKED_POLL_DATA_AB register. The drawer polling operation and logical AND operation are repeated for the DESE A'and DESE B' addresses if the ADDR_DESE_A'B'value is not 'FFFF'x using corresponding A', B' values.

The next operation illustrated in FIG. 6 is the flow diagram box numbered 108, which represents a mapping of the polling information result obtained from the previous step. The box numbered 108 indicates that, if needed, the DA controller reassigns any failed device with another device in another drawer. This processing operation is explained in greater detail as follows.

The functioning of a failed mirrored disk drive device (hereafter referred to as the paired device) can be reassigned to another disk drive device from another drawer. In such a case, either the MASK_DESE_AB register or the MASK_DESE_A'B' register contains only one bit that is non-zero and thereby identifies the newly assigned device. In the preferred embodiment, the newly assigned device is taken from the A', B' device adapter. That is, the drawer containing DESE A' and DESE B' contains the newly assigned device. The next processing task involved in reassigning the functioning of a failed device is to check the poll information from the reassigned device. This is accomplished by determining if the data value contained in the MASKED_POLL_DATA_A'B' register is non-zero. If the register value is non-zero, then a new value for the MASKED_POLL_DATA_AB register is obtained.

The first task in obtaining a new MASKED_POLL_DATA_AB register value is to perform a logical NOT operation on the MASK_DESE_AB register contents. This identifies which device address position in the original drawer needs to be replaced by the new device. The next task is to perform a logical OR operation of the NOT(MASK_DESE_AB) result with the current contents of the MASKED_POLL_DATA_AB register. This enables the interrupt of the reassigned device to be mapped to the original (failed) device in the drawer containing DESE A and DESE B. The result of the logical OR operation provides a new value for the MASKED-POLL_DATA_AB register, in which the result is stored.

The next task to be performed, either immediately after the MASKED_POLL_DATA_A'B' register is found to be non-zero or after the new value for the MASKED_POLL_DATA_AB is stored, is for the DA controller to perform a logical OR operation of the MASKED_POLL_DATA_AB register between the high byte contents and the low byte contents of the register. In the preferred embodiment, the low byte is used for devices designated as mirrored devices (also referred to as High Availability devices) and the high byte is used for base (non-mirrored) devices.

As an alternative to reassigning a mirror paired disk drive device to another device in another drawer, the DA controller can mirror device across drawers or can mirror devices with more than one device being reassigned upon a failure. In such circumstances, the contents of the MASK_DESE_AB register and the MASK_DESE_A'B' register will contain more than one bit that is non-zero. Again, however, eight bits of polling information must be assembled to indicate the newly assigned device. To obtain the information, the Map Poll Data 2-to-1 table is used. In this table, each poll group bit is derived by combining a number of poll information bits into two registers called MASKED_POLL_DATA_AB and MASKED_POLL_DATA_A'B' that specify a two devices to a single device mapping.

The 2-to-1 processing is useful, for example, if multiple devices fail within the same DESE. In such a case, the process of 2-to-1 mapping of the poll information is more complicated than described above for the single failure case. Assuming that the failed device is randomly replaced by any device connected to another DESE and that the order of the replacement is sequential from lower addresses to higher addresses (that is, taking the layout of FIG. 8 as an example, device '04'x would be replaced by device '0E'x and device '06'x would be replaced by device '49'x and not the other way around), then the DA controller uses a table to decode the logical NOT of the MASKED_DESE_AB and the MASKED_DATA_POLL_A'B' into multiple single device masks. Those skilled in the art will be able to construct the necessary decode table, in view of the description above, without further explanation. Temporary storage (up to sixteen words are required) will be used to contain the masks for each failed device. After the mask for each failed device is obtained, then the procedure to obtain the poll information is similar to combining the poll data for the single device failure case described above. The combining process is repeated for each failed device.

The last step in the polling operation is represented by the flow diagram box numbered 110, which indicates that the polling information is provided to the controller for the DASD array. The DASD system control unit 26 utilizes the polling information to perform the operations described above, which are like those typically performed by conventional DASD control units.

Figure 7:
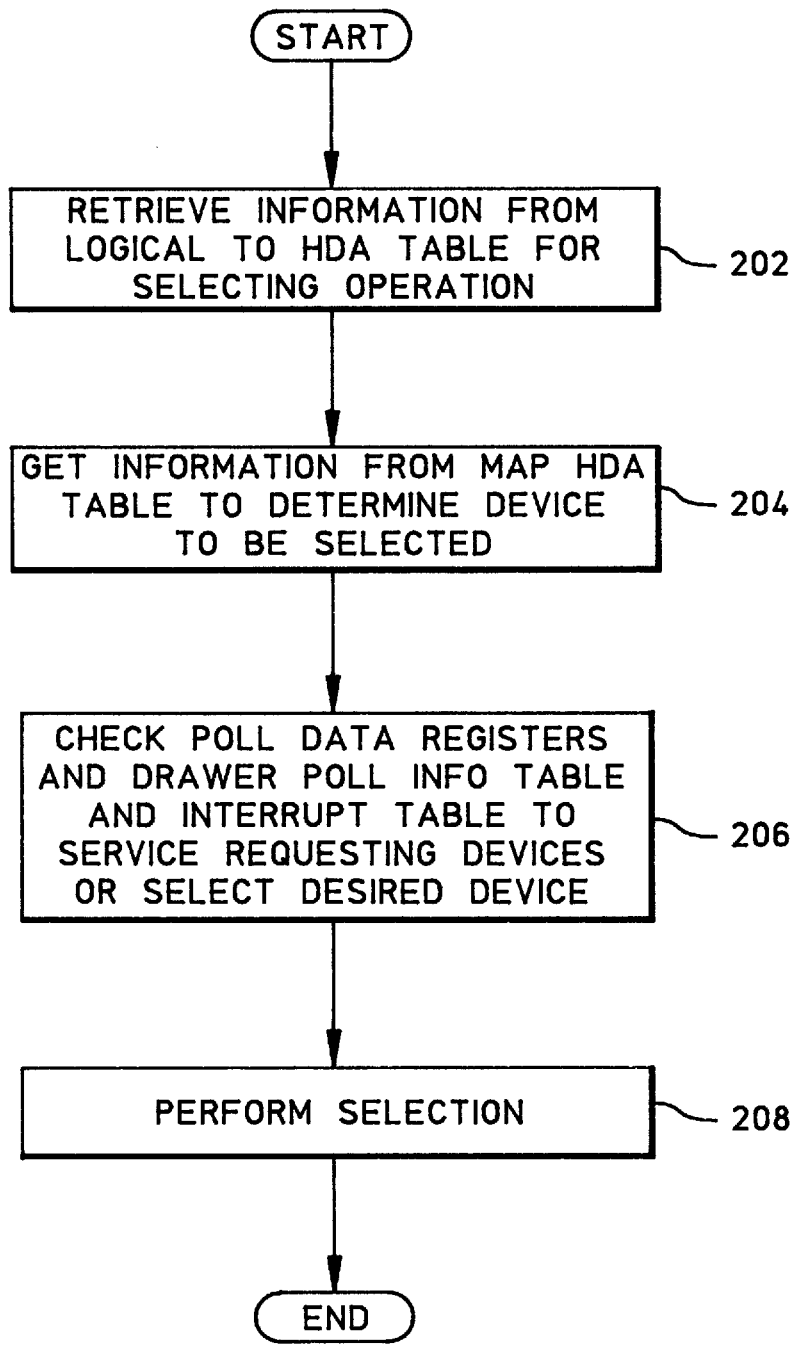
FIG. 7 is a flow diagram illustrating the processing steps followed by the device adapter of FIG. 2 in carrying out selection.

Another operation performed by the device adapter in accordance with the present invention is to perform selecting of a disk drive device. FIG. 7 is a flow diagram illustrating the processing steps followed by the device adapter in carrying out device selection. As indicated by the flow diagram box numbered 202, the first step in carrying out selection polling is to retrieve selecting information from the Logical to HDA table. The information is retrieved by the DA controller and includes the DESE address of the first (primary) drawer from the ADDR_DESE_AB register, the device address in the first drawer from the DEF_DEV_ADDR register, the DESE address of the second (paired) drawer from the ADDR_DESE_A'B' register, the device address in the second drawer from the PAIR_DEV_ADDR register, and the device type data from the DEV_TYPE register. In the preferred embodiment, there are two types of devices, either mirrored or base. The primary drawer is the drawer that has the DESE A and DESE B addresses. The paired drawer is the drawer that has the DESE A' and DESE B' addresses. It should be noted that the ADDR_DESE_A'B' register contains 'FFFF'x if there is only one disk drive device per logical device address.

After the requisite selection information is retrieved, the next step is to obtain information from the Map HDA table to determine the device to be selected, as represented by the flow diagram box numbered 204. This step comprises obtaining the relative address of a disk drive device within a specified drawer. More particularly, the DA controller uses the Map HDA table and the DEF_DEV_ADDR register and the PAIR DEV_ADDR register to determine which device is to be selected within a drawer. For example, a DASD array device address of '00'x is mapped to a device drawer address of '00'x and a DASD array device address of '40'x is mapped to a device drawer address of '08'x. The mapping of the other devices will be apparent to those skilled in the art without further explanation. The drawer-mapped address is stored in the DESE_DEV_ADDR register.

The next step in performing selection, as represented by the flow diagram box numbered 206, is for the DA controller to check the poll data registers and the drawer poll information table and Interrupt table to service requesting devices or select a desired device. The first task in performing this step is to check the POLL_DATA_AB_x registers corresponding to the addresses specified in the ADDR_DESE_AB register and the ADDR_DESE_A'B' register to determine if the specified devices have interrupts for servicing. If either both devices have interrupts or if neither device has an interrupt, then the primary device adapter DA controller selects the device specified in DEF_DEV_ADDR as the default device. Alternatively, if the device specified in DEF_DEV_ADDR does not have an interrupt and the device specified in PAIR_DEV_ADDR has an interrupt, then the primary device adapter DA controller selects the device specified in PAIR_DEV_ADDR and sets the device address of the PAIR_DEV_ADDR register to PRI_DEV_ADDR and sets the device address of DEF_DEV_ADDR to the value of SEC_DEV_ADDR if the secondary device adapter is not busy. If the situation is the reverse, that is, if the default device address has an interrupt and the paired device address does not, then the DA controller selects the default device address and accordingly sets the paired and default address registers.

The next step in selecting is represented by the flow diagram box numbered 208, which indicates that the DA controller performs a conventional selection operation on the device specified by PRI_DEV_ADDR or, if the device is a mirrored device type, by performing a conventional selection operation on the devices specified by PRI_DEV_ADDR and PAIR_DEV_ADDR.

Figure 8:
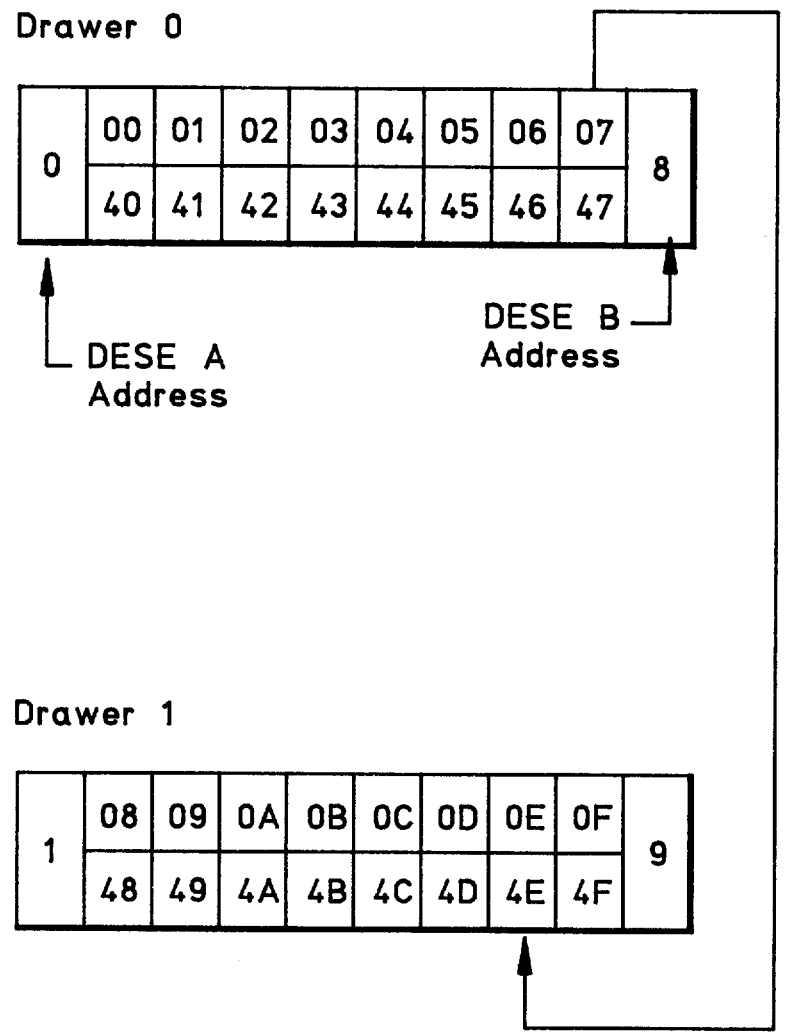
FIG. 8 is a block diagram representation of the disk drive devices illustrated in FIG. 2, illustrating the polling operation.

The processing described above is illustrated for the polling operation by FIG. 8, which shows a situation in which a device designated HDA '07'x in Drawer 0 has been reassigned to a device designated HDA '4E'x in Drawer 1. The disk drive devices in Drawer 0 corresponding to '00'x through '07'x are connected to DESE A (having a DESE address of 0) and the devices corresponding to '40'x through '47'x are connected to DESE B (having a DESE address of 8). A similar arrangement holds for the disk drive devices in Drawer 1, which are indicated as including DESE addresses of DESE 1 and DESE 9.

The operational steps carried out in processing an exemplary group poll of the disk drive devices designated '00'x through '07'x (Group 0) are indicated in FIG. 9 and should be apparent in view of the explanation and drawings provided above. These steps can be better understood with reference to the description of the device adapter registers and tables provided above and the operational steps described above in conjunction with the explanation of FIG. 6.

As indicated by the first entry in the FIG. 9 table, the first task performed by the DA controller in the polling operation is to read the summary poll register and obtain the DESE A and DESE B summary poll data. This is accomplished by forming a summary poll mask of 'FF'x, which will retrieve all of the poll information bits when applied to the poll data register. The next step is to obtain the summary poll mask. The FIG. 9 table indicates that the MASK_DESE_POLL register has a value of 'C0'x because, out of the sixteen DESEs available, only the first mirror pair (indicated as DESE A and DESE B) are of interest for this poll.

The next task in polling is to check for service interrupts, which is indicated in the table as comprising obtaining the result of a logical AND operation with the MASK_DESE_POLL value and the summary poll mask. With a mask of 'FF'x, it should be clear that the result of the logical AND operation will be 'C0'x. The next indicated task is to obtain the DESE addresses and masks. The ADDR_DESE_AB address is indicated as having a value of '00FF'x, thereby indicating that DESE 0 address in FIG. 8 (corresponding to the "DESE A" address in the ADDR_DESE_AB register) is being polled and that the other DESE of the drawer having an address of '08'x (corresponding to the "DESE B" address) is not paired with it. The ADDR_DESE_A'B' has been set to a value of '0109'x to indicate a paired drawer. In particular, the high byte value of '01'x indicates that the Drawer 0, DESE 0 in FIG. 9 has been paired with DESE 1 in Drawer 1.

The MASK_DESE_AB value of 'FEFF'x indicated in FIG. 9 should be readily apparent because the disk drive device having an address of '07'x has failed, meaning that the corresponding mask for the first eight devices corresponds to a bit pattern of 1111 1110, where a "1" indicates a functioning device and a "0" indicates a failed device. The MASK_DESE_A'B' value of '02'x in the low byte as indicated in FIG. 9 should be readily apparent because the Drawer 0 device '07'x has been reassigned to the Drawer 1 device '4E'x. It should be apparent that such a reassignment corresponds to a mask having a bit pattern of 0000 0010, equal to '02'x.

In the next polling task, both drawers are polled to obtain the device interrupts and the results are temporarily stored in the POLL_DATA_AB and POLL_DATA_A'B' registers. It should be clear that polling both Drawer 0 and Drawer 1 is necessary because of the reassignment following the failure of device '07'x. The returned Drawer 0 polling data, indicated by the POLL_DATA_AB value of '8340'x indicates that, from Drawer 0, devices '00'x, '06'x, '07'x, and '41'x require servicing (that is, have interrupt flags that are set high). As will be described more fully below, the '07'x interrupt will be ignored because the device has failed. The returned Drawer 1 polling data indicated by the POLL_DATA_A'B' value of 'FF06'x, indicates that devices '08'x through '0F'x are not paired and that Drawer 1 devices '4D'x and 4E'x have active interrupts.

The next task performed by the DA controller is to extract the appropriate data from the poll results using the DESE mask bytes and the logical AND operation. Thus, the table of FIG. 9 indicates that the result of the logical AND produces a MASKED_POLL_DATA_AB value of '8240'x. It should be noted that the DESE mask value of 'FEFF'x for Drawer 0 has effectively removed the poll information corresponding to disk drive device '07'x, which has failed, leaving a masked poll result value of '8240'x from an initial poll result value of '8340'x. Similarly, it should be noted that the DESE mask value of '0002'x for Drawer 1 has succeeded in extracting the poll result only for disk drive device '4E'x of Drawer 1. For this poll, however, device '4E'x is the only device from Drawer 1 in which we are interested, because it is the reassigned device corresponding to failed device '07'x from Drawer 0.

As noted above, because the MASKED_POLL_DATA_A'B' is non-zero, the DA controller recognizes that an across-drawer polling indicating a reassignment has taken place and therefore the next task it must perform, as indicated in the FIG. 9 table, is the mapping of the device '4E'x interrupt flag value to the device '07'x value. As indicated by FIG. 9, this is accomplished by forming the NOT (MASK_DESE_AB) mask value and then obtaining the logical sum (logical OR operation) of the mask and the MASKED_POLL_DATA_AB value to obtain the final POLL_DATA_AB poll information, which reproduces the desired poll information with the correct mapping.

The next task indicated in the FIG. 9 table is to obtain the logical sum of the high byte of the POLL_DATA_AB value with the low byte of the POLL_DATA_AB value, which comprises the operation ('83'x .OR. '40'x) and produces a result of 'C3'x. The result is an interrupt signal provided by the DA controller out over the data bus to the DASD array system control unit 26 for processing of the device '4E'x interrupt in a conventional manner. This processing will be understood by those skilled in the art without further explanation. The final polling task indicated in FIG. 9 is for the Drawer 0 and Drawer 1, device '4E'x interrupt information to be saved in the device adapter registers POLL_DATA_AB_ and POLL_DATA_AB_1, respectively.

Figure 10:
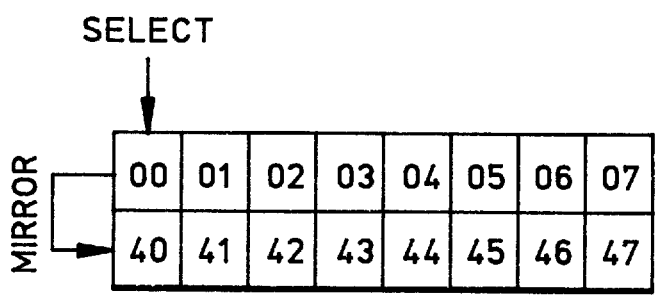
FIG. 10 is a block diagram representation of the disk drive devices illustrated in FIG. 2, illustrating the selection operation.

The processing described above is illustrated for the selection operation by FIG. 10, which shows a situation in which the device designated HDA '07'x in Drawer 0 has been reassigned to the device designated HDA '4E'x in Drawer 1 and the DA controller is to select the device at logical address '00'x, which is mirrored with the device at logical address '40'x. The example also assumes that DESE B of Drawer 0 has failed and that the Drawer 0 device interrupt corresponds to that illustrated in FIG. 8, namely, '8240'x. The changes in data values in accordance with the steps carried out in the selection process are illustrated in the table of FIG. 11.

In the first task for the selection operation, as represented by the first entry in the FIG. 11 table, the DA controller decodes the logical device address to obtain the physical device information. That is, the DA controller maps the logical address to the HDA, considering any reassignments. As indicated in FIG. 11, this mapping is accomplished by obtaining the contents of the following device adapter registers: the ADDR_DESE_AB register, the ADDR_DESE_A'B' register, the DEF_DEV_ADDR register, the PAIR_DEV_ADDR register, and the DEV_TYPE register. The DEV_TYPE register having a value that indicates high availability is an indication that the disk drive device being selected is paired with another disk drive device. Thus, mirror pairing is optionally specified in the system of the preferred embodiment.

The next selection task is indicated in FIG. 11 as determining which disk drive device to select first. As noted above, Device 0 of Drawer 0 has an active interrupt. The DEF_DEV_ADDR value of '00'x indicates the device is the default device. Therefore, the DA controller begins with selecting Device 0 for satisfying the active interrupt. To select the device, the DA controller sets the primary device address register value accordingly, as indicated in FIG. 11 by PRI_DEV_ADDR=DEF_DEV_ADDR. Finally, the last selection task illustrated in the FIG. 11 table is for the DA controller to map the physical address (HDA) of the device being selected to the relevant drawer address, which in this case is '00'x. This is accomplished by setting the PRI_DEV_ADDR register to the drawer value of '00'x.

The dynamic changes in the polling table values and device address table values made under the control of the DA controller can be achieved in a variety of ways. In the preferred embodiment, the DA controller maintains all of the tables needed for polling and selection, including the mapping tables, in a reserved area of the device adapter EEPROM. These tables require approximately 1K of EEPROM space. Those skilled in the art will appreciate that a load constant instruction can be used to load the appropriate data in the DA controller memory. The instruction will depend on the microprocessor used for the DA controller. In the preferred embodiment, for example, the DA controller microcode operating instruction set includes a Load Two-Byte Constant (LTBC) instruction.

Those skilled in the art will appreciate that designated locations in the device adapter EEPROM can easily be changed by using the LTBC instruction to store appropriate data, after generating the correct parity value in accordance with the DA controller. Those skilled in the art also will appreciate that the particular manner of loading such changes into the appropriate storage locations in the device adapter will depend on the particular microprocessor configuration implementation. Thus, the manner of loading such changes should be apparent to those skilled in the art without further explanation.

The present invention has been described above in terms of a presently preferred embodiment so that an understanding of the present invention can be conveyed. There are, however, many configurations for storage device control systems not specifically described herein but with which the present invention is applicable. The present invention should therefore not be seen as limited to the particular embodiment described herein, but rather, it should be understood that the present invention has wide applicability with respect to storage device control systems generally. All modifications, variations, or equivalent arrangements that are within the scope of the attached claims should therefore be considered to be within the scope of the invention.

We claim:

1. A device adapter that provides an interface between a plurality of disk drive devices each having an I/O controller and a controller of a disk drive subsystem in a computer system, the device adapter comprising:

a device adapter controller that receives requests for disk drive device status information from the disk drive subsystem controller and receives interrupt signals from the disk drive devices that require servicing from the disk drive subsystem controller;

a plurality of device electronic switch elements that provide an interface between the device adapter controller and the disk drive device I/O controllers:

a device address table containing data that represents a physical address for each disk drive device; and a polling information table containing data that represents the disk drive device status information for the disk drive devices listed in the device address table;

wherein the device adapter controller receives the disk drive device status information from the disk drive devices and dynamically changes the device address table and polling information table data for a disk drive device in response to disk drive device status information that indicates the disk drive device has failed;

wherein the device adapter maintains the device address table and polling information table according to an arrangement of the disk drive devices into a drawer of devices that includes disk drive devices connected to predetermined ones of the device electronic switch elements; and wherein the device adapter maintains the device address table and polling information table according to a mirror pairing of disk drive devices in which write data received from the disk drive subsystem controller is recorded into a mirror primary disk drive device and is recorded into a mirror paired disk drive device.

2. A device adapter as defined in claim 1, wherein the mirror pairing maintained by the device adapter includes a primary disk drive device from a first drawer and a paired disk drive device from a second drawer different from the first drawer.

3. A device adapter as defined in claim 2, wherein all the primary disk drive devices are members of an identical drawer and all the paired disk drive devices are members of an identical drawer.

4. A computer system including:

a central processor unit;

a plurality of disk drive devices each having an I/O controller that manages a flow of data into and out of the corresponding disk drive device;

a disk drive subsystem control unit that receives data read and write requests from users connected to the central processor unit;

a device adapter that provides an interface between the disk drive devices and the disk drive subsystem control unit;

a device adapter controller that receives requests for disk drive device status information from the disk drive subsystem control unit and receives interrupt signals from the disk drive devices that require servicing from the disk drive subsystem control unit;

plurality of device electronic switch elements that provide an interface between the device adapter controller and the disk drive device I/O controllers;

a device address table containing data that represents a physical address for each disk drive device; and a polling information table containing data that represents the disk drive device status information for the disk drive devices listed in the device address table;

wherein the device adapter controller receives the disk drive device status information from the disk drive devices and dynamically changes the device address table and polling information table data for a disk drive device in response to disk drive device status information that indicates the disk drive device has failed;

wherein the device adapter maintains the device address table and polling information table according to an arrangement of the disk drive devices into a drawer of devices that includes disk drive devices connected to predetermined ones of the device electronic switch elements; and wherein the device adapter maintains the device address table and polling information table according to a mirror pairing of disk drive devices in which write data received from the disk drive subsystem control unit is recorded into a mirror primary disk drive device and is recorded into a mirror paired disk drive device.

5. A computer system as defined in claim 4, wherein the mirror pairing maintained by the device adapter includes a primary disk drive device from a first drawer and a paired disk drive device from a second drawer different from the first drawer.

6. A computer system as defined in claim 5, wherein all the primary disk drive devices are members of an identical drawer and all the paired disk drive devices are members of an identical drawer.

7. A method of controlling data flow in a computer system having a plurality of disk drive devices each having an I/O controller and a control unit of a disk drive subsystem, the method comprising the steps of:

receiving requests at a device adapter for disk drive device status information from the disk drive subsystem control unit and receiving interrupt signals at the device adapter from the disk drive devices that require servicing from the disk drive subsystem control unit;

receiving disk drive device status information at the device adapter from the disk drive devices; and dynamically changing a device address table containing data that represents a physical address for each disk drive device and changing a polling information table containing data that represents the disk drive device status information for the disk drive devices listed in the device address table in response to disk drive device status information that indicates the disk drive device has failed so that the failed disk drive device is replaced in the polling information table with an operational disk drive device.

8. A method as defined in claim 7, wherein the step of dynamically changing includes ignoring interrupt signals received from any one of the disk drive devices that has failed.

9. A method as defined in claim 7, wherein the step of receiving requests includes the steps of receiving write data from the disk drive subsystem control unit into a buffer memory; and recording the write data into a disk drive device designated a primary device and into a disk drive device designated a mirror paired device.

10. A method as defined in claim 7, wherein the step of dynamically changing includes the step of maintaining the device address table and polling information table according to an arrangement of the disk drive devices into a drawer of devices that includes disk drive devices connected to predetermined device electronic switch elements that provide an interface between the device adapter and the disk drive device I/O controllers.

11. A method of controlling data flow in a computer system having a plurality of disk drive devices each having an I/O controller and a control unit of a disk drive subsystem, the method comprising the steps of:

receiving requests at a device adapter for disk drive device status information from the disk drive subsystem control unit and receiving interrupt signals at the device adapter from the disk drive devices that require servicing from the disk drive subsystem control unit;

receiving disk drive device status information at the device adapter from the disk drive devices; and dynamically changing a device address table containing data that represents a physical address for each disk drive device and changing a polling information table containing data that represents the disk drive device status information for the disk drive devices listed in the device address table in response to disk drive device status information that indicates the disk drive device has failed;

wherein the step of dynamically changing includes the step of maintaining the device address table and polling information table according to an arrangement of the disk drive devices into a drawer of devices that includes disk drive devices connected to predetermined device electronic switch elements that provide an interface between the device adapter and the disk drive device I/O controllers; and wherein the step of dynamically changing further includes maintaining the device address table and polling information table according to a mirror pairing of disk drive devices in which write data received from the disk drive subsystem controller is recorded into a mirror primary disk drive device and is recorded into a mirror paired disk drive device.

12. A method as defined in claim 10, wherein the step of dynamically changing further includes maintaining a mirror pairing in which a primary disk drive device is selected from a first drawer and a paired disk drive device is selected from a second drawer different from the first drawer.

13. A method as defined in claim 12, wherein all the primary disk drive devices are members of an identical drawer and all the paired disk drive devices are members of an identical drawer.

\* \* \* \* \*